Dec. 30, 1930. W. J. PUGH 1,787,322
OCCUPANT PROPELLED VEHICLE
Filed May 16, 1929 2 Sheets-Sheet 1
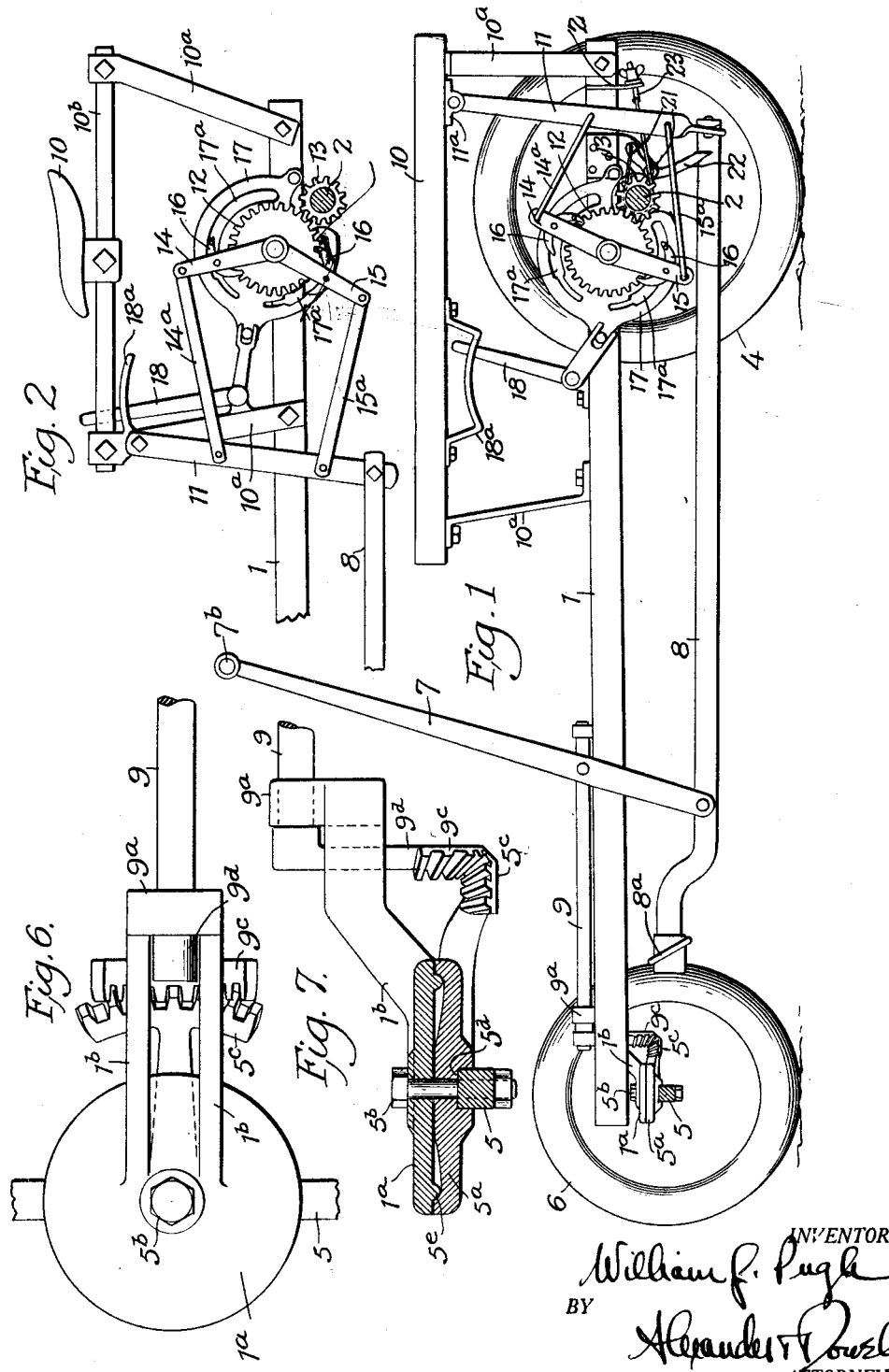

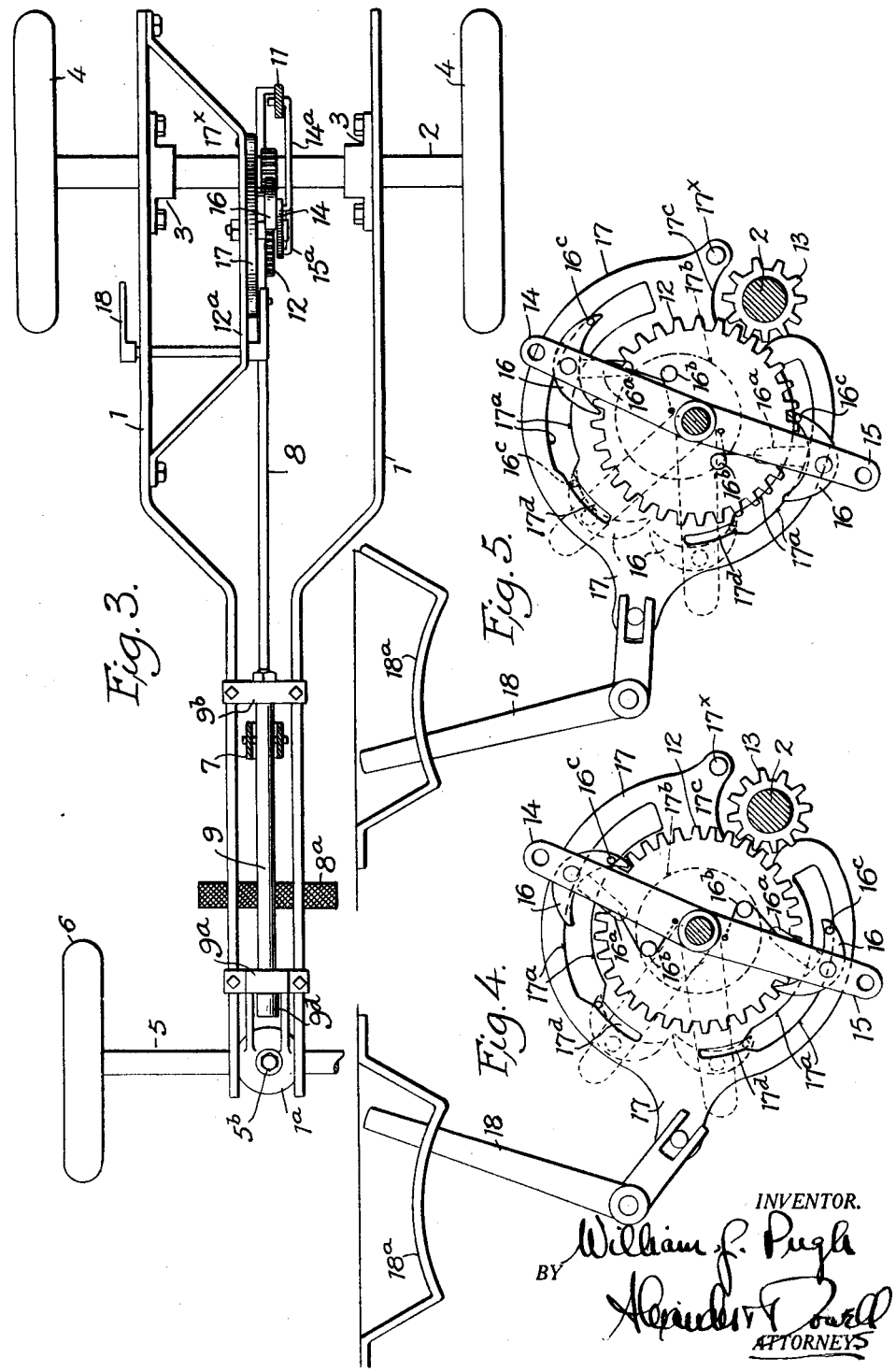

Patented Dec. 30, 1930

1,787,322

UNITED STATES PATENT OFFICE

WILLIAM J. PUGH, OF OAKLAND, CALIFORNIA

OCCUPANT-PROPELLED VEHICLE

Application filed May 16, 1929. Serial No. 363,690.

The invention is a novel improvement in occupant propelled vehicles, such as so-called "Irish mail" coasters and the like, particularly adapted for use by children; and the principal object of the invention is to provide a vehicle embodying certain novel improvements in the means for propelling, braking, and steering the vehicle in order that same will be more easily operated and safer to ride upon.

More specifically the objects of the invention are to provide novel propelling means for driving the vehicle comprising dog or ratchet mechanisms adapted to alternately rotate a driving gear in the same direction; means for maintaining the dogs in neutral position; means for shifting the dogs for operation in reverse direction; means for applying a brake while the dogs are in neutral position when the rocking beam is pulled backwardly into extreme position; also to provide means whereby the steering may be accomplished by pivoting the rocking beam transversely of the axis of the vehicle.

I will explain the invention with reference to the accompanying drawings which illustrate several practical embodiments thereof to enable others to adopt and use the same, and will summarize in the claims the novel features of construction, and novel combinations of parts, for which protection is desired.

In said drawings;

Fig. 1 is a longitudinal section through the vehicle embodying one form of the invention.

Fig. 2 is a similar section through a modified form.

Fig. 3 is a top plan view with the seat and brake removed.

Fig. 4 is an enlarged detail view of the eccentric clutch disk for controlling the position of the dogs, showing the dogs set for forward propulsion of the vehicle.

Fig. 5 is a view similar to Fig. 4 showing the disk and dogs set for reverse drive of the vehicle.

Fig. 6 is an enlarged plan view of the pivot for the front axle.

Fig. 7 is a side view of Fig. 6.

The invention is illustrated in connection with an "Irish mail" of well known type, briefly comprising two spaced longitudinal frames 1, supported at their rear ends upon a rear axle 2 journaled in bearings 3 secured to the side frames 1, said axle 2 carrying the rear or driving wheels 4 respectively. The forward ends of side frames 1 are supported on a front axle 5 carrying the front wheels 6, axle 5 being provided with a swivel head 5a at its center which is pivotally bolted as at 5b to a bearing plate 1a extending from the frames 1.

Between the frames 1 adjacent the front ends thereof is a rocking beam 7 and at the top of beam 7 is a handle cross-bar 7b for rocking the beam 7. Beam 7 is connected at its lower end by a link 8 to the vehicle driving mechanism, hereinafter described. Above the side frames 1, in rear of rocking beam 7, is a seat 10 supported at convenient height by brackets 10a, the seat 10 in Fig. 1 comprising a board, and in Fig. 2 the seat comprising a saddle adjustably mounted on an axially disposed bar 10b supported by the brackets 10a.

Rocking beam 7 is pivoted on an axially disposed rock shaft 9 journaled in bearings 9a, 9b secured between the side frames 1, the shaft 9 serving both as a steering shaft and as a pivot bearing for the rocking beam 7; and said shaft extends forwardly to a point adjacent the bearing plate 1a and is provided with a segmental beveled gear 9c meshing with a segmental beveled gear 5c on the front axle concentric with the pivot bolt 5b thereof, whereby rotation of shaft 9 by throwing rocking beam 7 to one side or the other of the vertical axis of the vehicle frame will cause the front axle 5 to be pivoted correspondingly for steering purposes.

As shown in Figs. 6 and 7, swivel head 5a and segmental gear 5c may be formed in an integral casting, the bottom face of the head 5a having a groove 5d extending transversely thereacross adapted to receive the top of the front axle 5, which is preferably of rectangular cross-section, to prevent relative rotation of the head 5a upon the axle. The upper face of head 5a is preferably slightly dish-shaped at its periphery as at 5e to receive correspondingly shaped bearing portion on the lower face of the bearing plate 1a. The bearing plate 1a is supported by two parallel upwardly inclined arms 1b fitting between the side frames 1. The rear ends of arms 1b are preferably connected to, or integral with, the forward bearing 9a for the steering shaft 9; and the spoke 9d of the segmental gear 9c is preferably disposed between the arms 1b thereby limiting rotation of gear 9c and the turning movement of the front axle 5. The pivotal bolt 5b of the front axle transfixes the bearing plate 1a, swivel head 5a, and the front axle 5 and maintains said parts in working engagement.

The lower end of the rocking beam 7 projects below the shaft 9 and is pivotally connected to the single draw bar 8, the rear end of bar 8 being pivotally attached to the lower free end of a lever 11 the upper end of which is pivotally attached (in Fig. 1) to a bracket 11a secured to the underside of the seat 10 in rear of the rear axle 2, or (in Fig. 2) to the brackets 10a supporting the front end of bar 10b, whereby movement of rocking beam 7 axially of the vehicle frame, will move the lever 11 correspondingly, although movement of the beam 7 transversely of the frame for steering purposes will not swing lever 11. Draw bar 8 extends forwardly of its connection with the beam 7 and is provided with foot pedals 8a whereby the foot power of the occupant may be utilized to augment his hand power in propelling the vehicle.

In front of the rear axle 2 and journaled on a plate 12a is a relatively large gear 12, meshing with a small pinion 13 fixedly mounted upon the rear axle 2 whereby rotation of the gear 12 will impart rotation to the said axle. Beside the gear 12 and journaled on said plate 12a coaxial with gear 12 are pivoted two dog levers 14 and 15, the lever 14 extending radially upwardly above the gear 12, and the lever 15 extending radially downwardly below the gear 12. The outer ends of the dog levers 14 and 15 connected respectively to the lever 11 by means of push and pull links 14a and 15a whereby as lever 11 is swung the dog levers 14 and 15 will be rocked simultaneously and in the same direction. Near the outer end of each dog lever 14 and 15 is a pivoted double-ended dog 16 adapted to be swung so that either toothed end will engage the teeth of gear 12 to rotate said gear 12 therewith when the levers 14 and 15 are moved in one direction or to slide or ratchet over the gear teeth when the levers are rocked in the other direction. Means are provided on the dogs 16 for normally yieldingly maintaining them in "set" position with either end engaging the teeth and for maintaining the dogs 16 in "neutral" position wherein both ends are disengaged from the teeth of gear 12.

As shown in Figs. 4 and 5 each dog 16 has a centrally disposed arm 16a extending inwardly towards the journal of gear 12 and a bowed spring 16b connecting the outer end of arm 16a with its respective dog lever 14 or 15 adjacent its inner end tends to yieldingly swing one or the other toothed end of dog 16 into operative engagement with gear 12 according to the position of the reversing disk (hereinafter explained). On the rear end of each dog 16 is a pin 16c which enters in a substantially arcuate slot 17a in a reversing disk 17 pivoted at its rear end as at 17x on the plate 12a. The slots 17a in disk 17 are substantially diametrically opposed. The center of disk 17 in way of the hubs of gear 12 and dog levers 14 and 15 is cut away as at 17b; also the rear portion of the disk below its pivot in way of rear axle 2 is cut away as at 17c. The forward end of the disk 17 is supported by a hand operated bellcrank lever 18 whereby the said forward end of the disk may be raised or lowered within the limits of a fixed guide 18a by manipulation of lever 18. Pins 16c on the dogs 16 normally do not quite touch the sides of the slots 17a when operating, but at the forward end of each slot 17a is a slot 17d of width restricted to just receive the pins 16c, the sides of the slot 17a converging sharply towards the entrance into slot 17d.

The inclined portions between the slots 17a and 17d raise or lower the dogs 16 as the case may be when the pins 16c slide thereon from slot 17a to the slot 17d into "neutral" position. When the hand lever 18 is in "forward" position with respect to the fixed guide 18a, and the rocking beam 7 pulled rearwardly its maximum extent, the dog levers 14 and 15 will have been pushed forwardly by lever 11 their maximum extent and the pins 16c on both dogs 16 will have entered the restricted slots 17d as shown in dotted lines on Fig. 4 and the slots 17d will have caused the dogs 16 to rotate into neutral position wherein the dogs will be positively held out of engagement with the gear 12, and the vehicle can coast or be moved irrespective of the driving means. In this "forward" position the hand lever 18 the arms 16a of dogs 16 are held almost at their dead-centers, but just enough to one side thereof so that when the levers are swung within their normal working limits the springs 16b will snap the dogs 16 into the position shown in full lines in Fig. 4 so that the levers 14 and 15 will alternately rotate the gear 12 in a clockwise direction as the levers 14 and 15 are swung. In this position the pin 16c on the dog of levers 14 moves adjacent the inner edge of its slot 17a while the pin 16c on the dog of lever 15 moves adjacent the outer edge of its slot 17a as clearly indicated in Fig. 4. It will be noted that in Fig. 4 the rear end of the dog 16 on arm 14 and the front end of dog 16 on arm 15 engage the gear 12 for "forward" driving at the same time; and vice versa in Fig. 5 the rear end of the dog on lever 14 and the front end of the dog on lever 15 engage the gear 12 at the same time for "reverse" driving, hence as the arms 14 and 15 swing together one dog is driving the gear while the other is idly ratcheting upon the gear, both dogs alternately driving the gear 12 in the same direction.

In Fig. 5 the hand lever 18 is swung for "reverse" driving thereby raising the front end of disk 17 so that when the pins 16c of the dogs on levers 14 and 15 are in "neutral slots" 17d (as shown in dotted lines) the arms 16a of the dogs will be slightly off their dead center positions and to the opposite side of the axes of their levers so that when the levers 14 and 15 are rocked into the limits of their normal working strokes the springs 16b will snap the dogs 16 into the opposite positions from that shown in Fig. 4. In Fig. 5 the pin 16c on the dog of lever 14 moves adjacent the outer edge of its slot 17a while the pin 16c on the dog of lever 15 moves adjacent the inner edge of its slot 17a.

Hence the outer edge of the upper slot 17a and the inner edge of the lower slot 17a is made concentric with the axis of gear 12 when the disk 17 is in uppermost "reverse" position, and the outer edge of the lower slot 17a on the inner edge of the upper slot 17a is made concentric with the axis of gear 12 when the disk 17 is in lowermost "forward" position. Also the slots 17a are wide enough so that the pins 16c do not quite contact with either edge of the slots when in operation therein; hence the pins 16c under normal working conditions move freely in slots 17a and do not touch the sides thereof, but if a dog 16 should be accidentally jolted over into the opposite position from which it was set its opposite end would tend to engage the teeth of gear 12, but the pin 16c of such dog would engage the opposite edge of the slot and the dog would be actually prevented from contacting with gear 12 in such jolted position unless of course the reversing disk 17 were thereafter raised or lowered, as the case might be, to permit actual engagement of the jolted dog with the gear teeth. If the rocking beam 7 is pulled into neutral position to cause the pin 16c of the jolted dog to enter the neutral slot 17d, the jolted dog 16c when later returned into the normal working limit of slot 17a would again resume its former working position, i. e. the position it originally assumed before being jolted.

When the dogs 16 are held in neutral position and the vehicle may be coasting, as above explained, a brake may be applied. Said brake preferably comprises a drum mounted on the rear axle 2, over and around which is wrapped a brake cable 21 (Fig. 1) having its upper end secured to a depending lever 22 pivoted intermediate its ends on the vehicle frame, the lower free end of lever 22 lying in the path of swing of the lever 11 and adapted to be engaged thereby at the end of the normal working stroke of the rocking beam 7 when the pins 16c of dogs 16 are in the "neutral" slots 17d. The lower end of brake band 21 is attached to a bolt 23 on a bracket 24 secured to the main frame, and arranged so that the slack in the band may be taken up as it develops by adjusting the nut on said bolt, thereby adjusting the length of the cable. When the brake lever 22 is swung forwardly the upper run of cable 21 is pulled rearwardly to contract the cable around the brake drum on shaft 2, but normally the lever 22 hangs downwardly permitting the cable to expand loosely around the drum.

In operation, the two opposed dog-levers 14 and 15 journaled coaxially with the gear 12 working simultaneously in the same direction fore and aft drive the gear 12 in the same direction alternately to rotate the rear axle 2, one dog lever operating upon the gear 12 while the other idles thereby giving constant rotation to gear 12, and the dogs 16 being double ended for driving the gear 12 in reverse directions. A sufficient rearward pull on the rocking beam 7 rotates both dogs 16 into neutral position when their pins 16c enter slots 17d, and at a further or extreme rearward movement of beam 7 the brake is applied, thus when impending danger is confronted the operator subconsciously will throw himself backwardly pulling back the rocking beam 7 with his hand, and pushing forwardly on the foot pedals 8 with his feet. The reversing disk 17 effectively controls the position of the dogs by engagement of the pins 16c with the slots 17a and 17d.

I do not limit my invention to the exact forms shown in the drawings for obviously changes may be made therein within the scope of the claims.

I claim:

1. In a vehicle, an axle, a gear for rotating said axle; a drive lever journaled beside said gear; means for rocking the lever, a double-ended dog pivoted on said lever adapted to engage the gear teeth with either end; means for yieldably maintaining either end of the dog in contact with said gear; and means for automatically shifting and maintaining the dog in neutral position when the lever is rocked beyond one end of its normal working stroke, said means permitting the dog to resume its former driving contact with the gear when the lever returns within the limits of its working stroke.

2. In combination with a vehicle as set forth in claim 1, a brake arm pivoted adjacent the axle, the lower end of the brake arm lying in the path of the means for rocking the drive lever, and adapted to be engaged thereby when the dog is in neutral position; and a brake band around the axle having one end fixed and the other end secured to the brake arm, whereby as the arm is rocked the band will be contracted around the axle.

3. In a vehicle as set forth in claim 1, said yieldable means comprising an axially disposed arm on the dog projecting towards the inner end of the lever; and a contracted bow spring interposed between the outer end of the arm and the inner end of the lever.

4. In a vehicle as set forth in claim 1, an axially disposed steering shaft on the vehicle; and said drive lever rocking means comprising a rocking beam pivoted on said steering shaft; and links connecting the rocking beam and drive lever whereby as the rocking beam is swung axially of the vehicle the drive lever will be actuated to rotate the gear, and whereby as the rocking beam is swung transversely of the vehicle the steering shaft will be correspondingly actuated.

5. In a vehicle as set forth in claim 1, said dog shifting means comprising a cam disk pivoted adjacent the lever and having a substantially arcuate slot; means for shifting the disk into "forward" or "reverse" positions; a pin on the dog adapted to operate in the slot during the normal working movement of the lever; and a restricted slot at one end of the first mentioned slot adapted to rotate the dog into almost dead center position when the pin enters therein and maintain the dog disengaged from the gear teeth while the lever is swung beyond its normal working limits.

6. In a vehicle, an axle, a gear for rotating said axle; a pair of drive levers journaled co-axially with said gear; and extending in opposite directions beyond the periphery of the gear; means for simultaneously rocking the lever in the same direction; a double-ended dog pivoted on each lever adapted to engage the gear teeth with either end thereof; means for yieldably maintaining the dogs in driving contact with said gear for alternately driving the gear in the same direction as the levers are swung; and means for automatically shifting and maintaining the dogs in neutral position when the levers are rocked beyond the limits of their normal working strokes, said means permitting the dogs to resume their former driving engagements with the gear when the levers return within the limits of their working strokes.

7. In combination with a vehicle as set forth in claim 6, a brake arm pivoted adjacent the axle, the lower end of the brake arm lying in the path of the means for rocking the drive levers, and adapted to be engaged thereby when the dogs are in neutral position; and a brake band around the axle having one end adjustably fixed to the vehicle frame and the other end secured to the brake arm, whereby as the arm is rocked the band will be contracted around the axle.

8. In a vehicle as set forth in claim 6, said yieldable means comprising an axially disposed arm on each dog projecting towards the inner end of its respective lever; and contracted bow springs interposed between the outer ends of the arms and the inner ends of the levers respectively.

9. In a vehicle as set forth in claim 6, an axially disposed steering shaft on the vehicle; and said drive lever rocking means comprising a rocking beam pivoted on said steering shaft; a depending pivoted arm adjacent the rear axle; push and pull rods connecting the depending arm with the drive levers; and a draw bar connecting the lower end of the rocking beam with the depending arm whereby as the rocking beam is swung axially of the vehicle the drive levers will be actuated to rotate the gear, and whereby as the rocking beam is swung transversely of the vehicle the steering shaft will be correspondingly actuated.

10. In a vehicle as set forth in claim 6, said dog shifting means comprising a cam disk pivoted adjacent the lever and having a pair of substantially arcuate slots; means for shifting the disk into "forward" or "reverse" positions; a pin one one end of each dog adapted to operate in its related slot during the normal working movement of its lever; one edge of the slot being concentric with the journal of the lever when in forward position and the other edge of the slot being concentric with the axis of the lever when the disk is in reverse position; each slot being of insufficient width to permit the dog to be jolted over into the opposite position from that for which the disk is set; and restricted slots at one end of each of the first mentioned slots adapted to rotate the dogs into almost dead center positions when the pins enter therein and maintain the dogs disengaged from the gear teeth.

11. In a vehicle, an axle, a gear for rotating said axle; a drive lever journaled concentric with said gear; means for rocking the lever, a dog pivoted on said lever adapted to engage the gear to drive the same; means for automatically maintaining the dog disengaged from the gear when the lever is rocked beyond its normal working stroke; a brake arm pivoted adjacent the axle, the lower end of the brake arm lying in the path of the lever rocking means and adapted to be engaged thereby when the dog is in disengaged position; and a brake band around the axle having one end adjustably fixed to the vehicle frame and the other end secured to the brake arm whereby as the arm is rocked the band will be contracted around the axle.

12. In a vehicle an axle; a gear for rotating said axle; a lever beside the gear, a dog pivoted on said lever and adapted to engage the teeth of said gear to drive the gear with said lever; an axially disposed arm on the dog projecting towards the inner end of the lever; and a contracted bow spring interposed between the outer end of the arm and the inner end of the lever for yieldably maintaining the dog in engagement with the gear teeth.

13. In a vehicle a pivoted front axle; a rear axle; means associated with the rear axle for driving the vehicle; an axially disposed steering shaft on the vehicle for pivoting the front axle; a rocking beam pivoted on said steering shaft; and a link connecting the rocking beam and the rear axle driving means whereby as the rocking beam is swung axially of the vehicle the vehicle will be driven and whereby as the rocking beam is swung transversely of the vehicle the vehicle will be steered accordingly.

14. In a vehicle as set forth in claim 13, the link extending forwardly of its connection with the rocking beam; and foot rests on the forward end of the link whereby the foot power of the occupant may be utilized to augment his hand power while propelling the vehicle.

15. In a vehicle as set forth in claim 13, an axially disposed bar in rear of the rocking beam above the rear axle; and a saddle adjustably mounted on said bar.

16. In a vehicle as set forth in claim 13, intermeshing segmental bevel gears carried by the front axle and steering shaft respectively for pivoting the front axle as the shaft is rocked.

17. In a vehicle, a driving gear; one or more levers beside the gear; a double ended dog on each lever adapted to engage the gear teeth; and means for automatically shifting each dog into neutral position when the lever is rocked beyond its normal working limits, said means comprising a cam disk pivoted adjacent the levers and having substantially arcuate slots therein; means for shifting the disk into "forward" or "reverse" positions; a pin on each dog adapted to operate in its respective slot during the normal working limits of its lever; and a restricted slot at one end of each first mentioned slot adapted to rotate its related dog into almost dead center position when its pin enters therein and maintain the dog disengaged from the gear teeth.

18. In a vehicle as set forth in claim 17, one edge of each slot being concentric with the journal of the lever when the disk is set in "forward" position, and the other edge of the slot being concentric with the journal of the lever when the disk is in "reverse" position; and said slot being of insufficient width to permit the dog from being jolted over into the opposite position from that in which the disk is set.

WILLIAM J. PUGH.